(12) United States Patent
Salter et al.

(10) Patent No.: US 10,023,110 B1
(45) Date of Patent: Jul. 17, 2018

(54) VEHICLE BADGE SENSOR ASSEMBLY

(71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/493,695

(22) Filed: Apr. 21, 2017

(51) Int. Cl.
| *H03K 17/955* | (2006.01) |
| *B60J 5/00* | (2006.01) |
| *B60Q 1/56* | (2006.01) |
| *B60S 1/56* | (2006.01) |
| *B60S 1/60* | (2006.01) |
| *B60S 1/02* | (2006.01) |
| *B60R 13/00* | (2006.01) |
| *H05B 37/02* | (2006.01) |

(52) U.S. Cl.
CPC .............. *B60Q 1/56* (2013.01); *B60R 13/005* (2013.01); *B60S 1/026* (2013.01); *B60S 1/563* (2013.01); *B60S 1/603* (2013.01); *H05B 37/0227* (2013.01); *B60Q 2400/00* (2013.01)

(58) Field of Classification Search
CPC ......... B60Q 1/56; B60R 13/005; B60S 1/563; B60S 1/603; H05B 37/0227
See application file for complete search history.

(56) References Cited

U.S. PATENT DOCUMENTS

| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |

(Continued)

FOREIGN PATENT DOCUMENTS

| CN | 101337492 A | 1/2009 |
| CN | 201169230 Y | 2/2009 |

(Continued)

*Primary Examiner* — Dedei K Hammond
*Assistant Examiner* — Raymond R. Chai
(74) *Attorney, Agent, or Firm* — Jason Rogers; Price Heneveld LLP

(57) ABSTRACT

A badge is provided herein. The badge includes a proximity sensor located on said badge providing an activation field. The badge further includes control circuitry configured to monitor a signal responsive to the activation field and determine a switch activation based on the signal. The control circuitry is further configured to determine a moisture value based upon the signal.

19 Claims, 14 Drawing Sheets

(56) References Cited

U.S. PATENT DOCUMENTS

| | | |
|---|---|---|
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,065,447 B2 | 6/2015 | Buttolo et al. |
| 9,067,556 B2 | 6/2015 | Bosch et al. |
| 9,187,034 B2 | 11/2015 | Tarahomi et al. |
| 9,299,887 B2 | 3/2016 | Lowenthal et al. |
| 9,495,040 B2 | 11/2016 | Salter et al. |
| 2002/0159741 A1 | 10/2002 | Graves et al. |
| 2002/0163792 A1 | 11/2002 | Formosa |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2006/0157462 A1 | 7/2006 | Weiss et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2011/0043230 A1* | 2/2011 | Morton ............... G01N 33/246 324/694 |
| 2012/0001406 A1 | 1/2012 | Paxton et al. |
| 2012/0104954 A1 | 5/2012 | Huang |
| 2012/0123649 A1* | 5/2012 | Eggers .................. B60R 13/07 701/49 |
| 2012/0183677 A1 | 7/2012 | Agrawal et al. |
| 2012/0213649 A1* | 8/2012 | Sumi ..................... F04B 35/04 417/410.1 |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0183302 A1* | 7/2015 | Da Deppo ............. B60R 11/04 49/324 |
| 2015/0267881 A1 | 9/2015 | Salter et al. |
| 2015/0333240 A1 | 11/2015 | Salter et al. |
| 2016/0016506 A1 | 1/2016 | Collins et al. |
| 2016/0214525 A1 | 7/2016 | Sheehan et al. |
| 2016/0236613 A1 | 8/2016 | Trier |
| 2016/0329894 A1* | 11/2016 | Buschmann ......... H03K 17/955 |
| 2017/0213525 A1* | 7/2017 | Tamegai ................. G09G 5/10 |
| 2017/0350169 A1* | 12/2017 | Kubo ..................... E05B 81/77 |
| 2018/0059091 A1* | 3/2018 | Schibli ............ G01N 33/48785 |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| KR | 1020140134760 | 11/2014 |
| WO | 2006047306 A1 | 5/2006 |
| WO | 2014068440 A1 | 5/2014 |

* cited by examiner

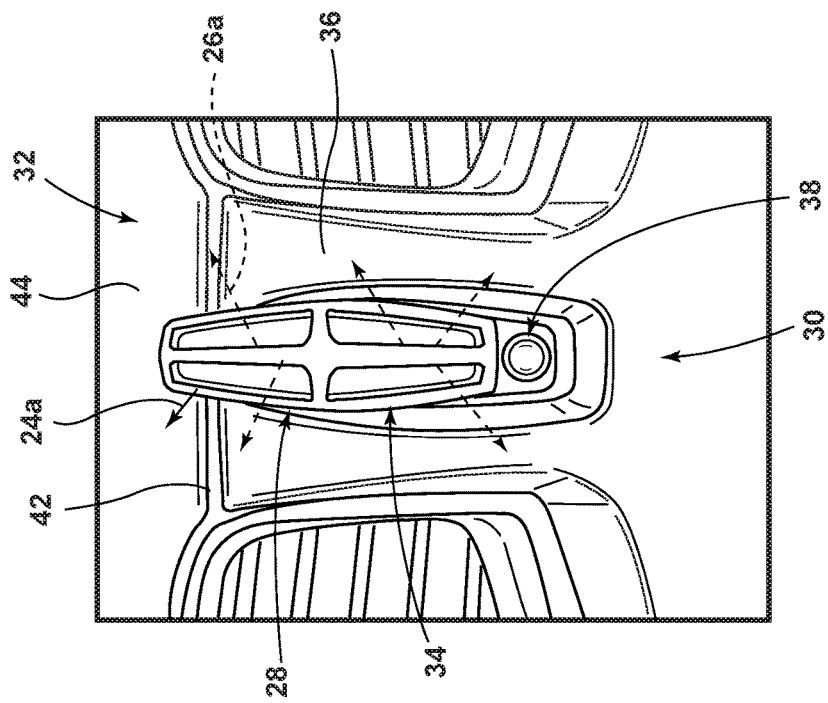
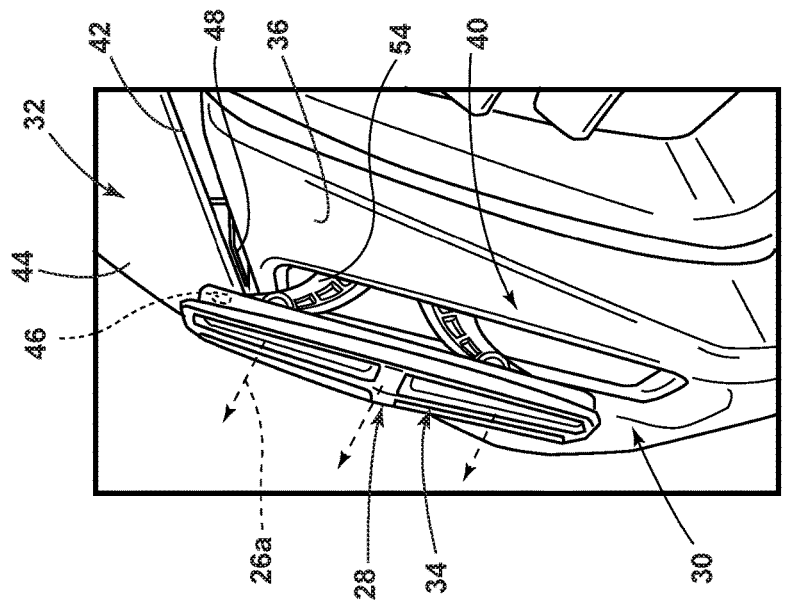
FIG. 3B
FIG. 3A

VEHICLE BADGE SENSOR ASSEMBLY

FIELD OF THE INVENTION

The present disclosure generally relates to vehicle lamp assemblies and, more particularly, to vehicle lamp assemblies employing one or more luminescent structures.

BACKGROUND OF THE INVENTION

Badges, or emblems, are commonly employed on vehicles to prominently display a vehicle manufacturer's logo, name, or other graphic display. For some vehicles, it may be desirable to have a more prominent upscale badge to enhance the attractiveness of the vehicle.

SUMMARY OF THE INVENTION

According to one aspect of the present invention, a badge is disclosed. The badge includes a proximity sensor located on said badge providing an activation field. Control circuitry is configured to monitor a signal responsive to the activation field and determine a switch activation based on the signal. The control circuitry is further configured to determine a moisture value based upon the signal.

According to another aspect of the present invention, a vehicle badge is disclosed. The vehicle badge includes a substrate coupled to a housing. The substrate and housing are movable between a retracted and a deployed position. A proximity sensor is located on a badge and provides an activation field. Control circuitry is configured to monitor a signal responsive to the activation field and determine a position of the substrate based on the signal. The control circuitry is further configured to determine a moisture value based upon the signal.

According to yet another aspect of the present invention, a vehicle badge is disclosed. The vehicle badge includes a substrate coupled to a housing. The substrate and housing are movable between a retracted and a deployed position. A proximity sensor is located on the substrate or the housing and provides an activation field. A heating device is located on the substrate or housing. Control circuitry is configured to determine a moisture value based upon a signal and activate the heating device when condensation is detected on the substrate or the housing.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3A is a side perspective view of the badge in the deployed position having one or more light sources therein, according to some examples;

FIG. 3B is a front perspective view of the badge in the deployed position, according to some examples;

DETAILED DESCRIPTION OF THE PREFERRED EXAMPLES

Figure 2:
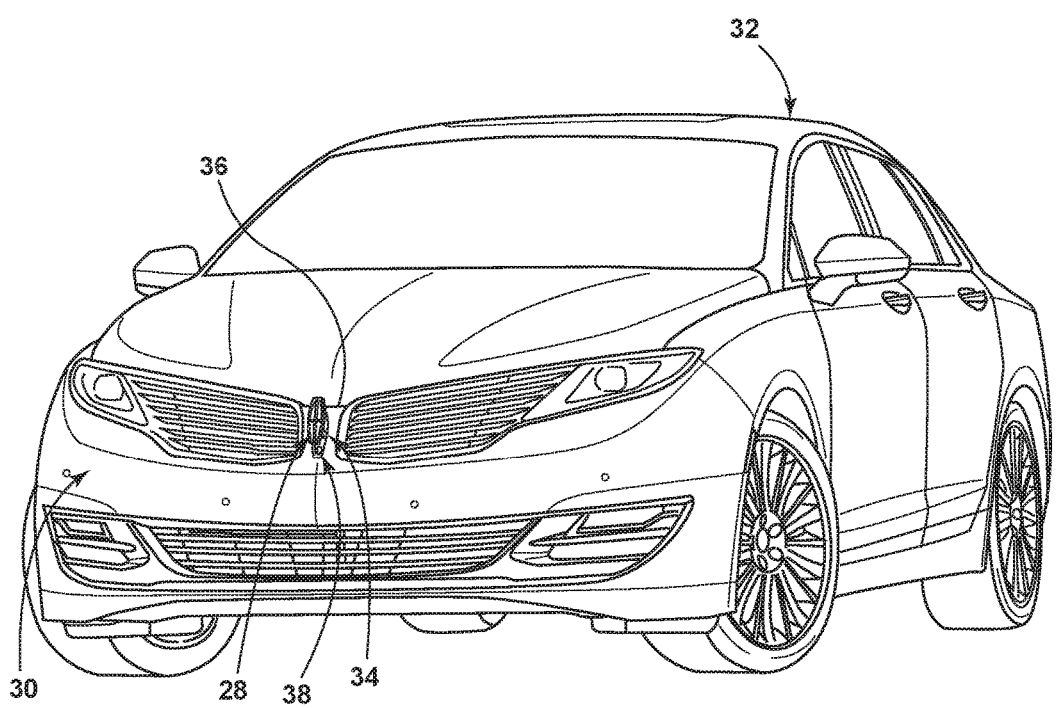
FIG. 2 is a front side perspective view of a motor vehicle incorporating a sensor assembly and a heating device within a badge, according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a badge for a vehicle. The badge may employ one or more phosphorescent and/or luminescent structures to luminesce in response to predefined events. The one or more luminescent structures may be configured to convert excitation light received from an associated light source and re-emit the light at a different wavelength generally found in the visible spectrum. The badge may further include a sensor assembly and/or a heating device.

Figure 1A:
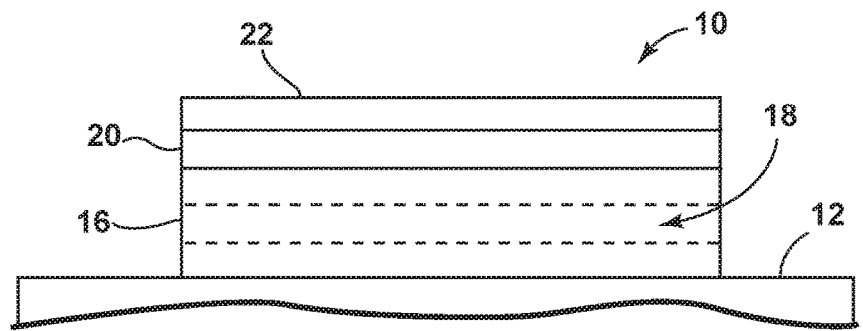
FIG. 1A is a side view of a luminescent structure rendered as a coating, according to some examples.
Figure 1B:
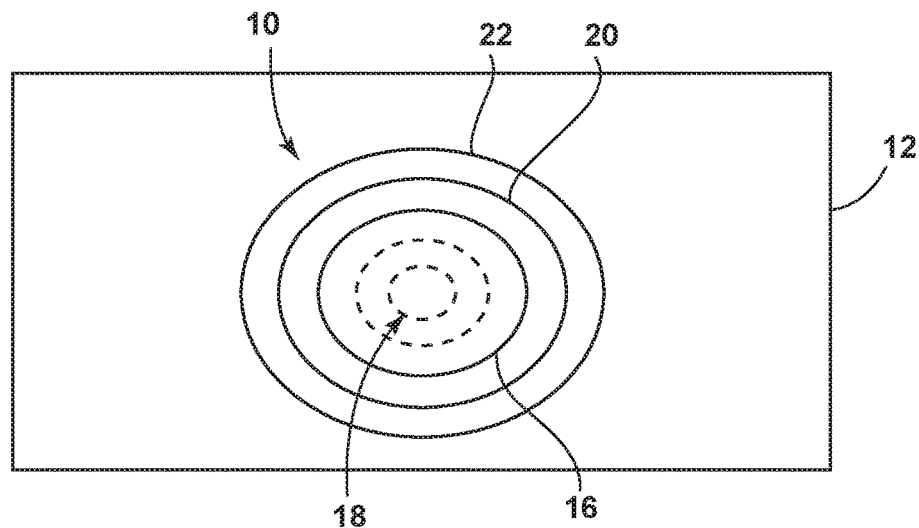
FIG. 1B is a top view of a luminescent structure rendered as a discrete particle, according to some examples.
Figure 1C:
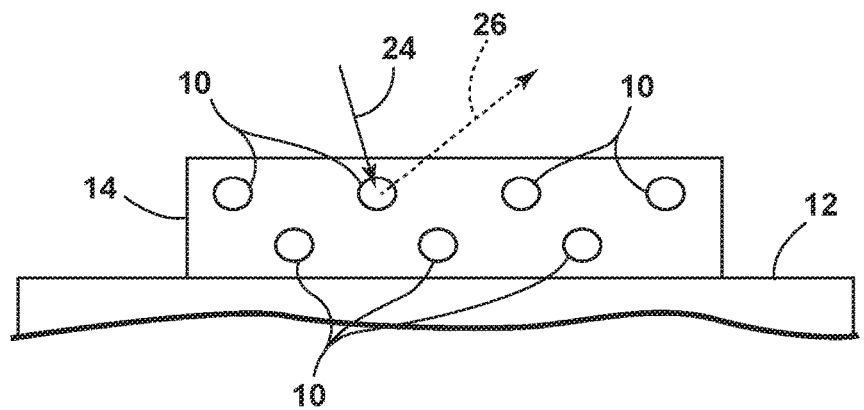
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer-wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 46 (FIG. 5) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue excitation light 24 emitted from the light sources 46. According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 46). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various examples, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 46 that emit the excitation light 24, including, but not limited to, natural light sources (e.g., the sun) and/or any artificial light sources 46. The periodic absorption of the excitation light 24 from any excitation source may provide for a substantially sustained charge of the long-persistence luminescent material 18 to provide for consistent passive illumination. In various examples, a light sensor may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Referring to FIG. 2, a badge 28 is generally shown mounted on the front portion 30 of a vehicle 32. In other examples, the badge 28, or any other trim component, may be located elsewhere, such as, but not limited to, other locations of the front portion 30, a side portion, or a rear portion of the vehicle 32. Alternatively, the badge 28 may be disposed inside the vehicle 32. The badge 28, or emblem, may be configured as an insignia that is presented as an identifying mark of a vehicle manufacturer, or any other desired information, and includes a viewable portion 34 that is generally prominently displayed on the vehicle 32. In the presently illustrated example, the badge 28 is centrally disposed on a front fascia 36 of the vehicle 32, thus allowing the badge 28 to be readily viewed by an observer looking head-on at the vehicle 32. The badge 28 may be articulable and conceal a hidden imaging system 38 which may be disposed behind the badge 28, or any other cover disposed on the vehicle 32.

Referring to FIGS. 3A-3D, the imaging system 38 may move between a retracted position and a deployed position.

When in a deployed position, the badge 28 is disposed forwardly of a proximately disposed vehicle component 40, such as the front fascia 36 of the vehicle 32, and may also be disposed above the forward edge 42 of a vehicle hood 44. The badge 28 may include one or more light sources 46 that may emit excitation light 24a and/or converted light 26a forwardly of the vehicle 32 and/or the badge 28. The one or more light sources 46 may also emit excitation light 24b and/or converted light 26b rearwardly of the badge 28. The forwardly emitted light 24a, 26a may provide a distinct aesthetic feature for the vehicle 32 and/or provide illumination for the imaging system 38 disposed behind the badge 28. The rearwardly emitted light 24b, 26b may be used to illuminate a secondary hood release latch 48, an engine compartment 50 of the vehicle 32, and/or any other feature of the vehicle 32.

Figure 3C:
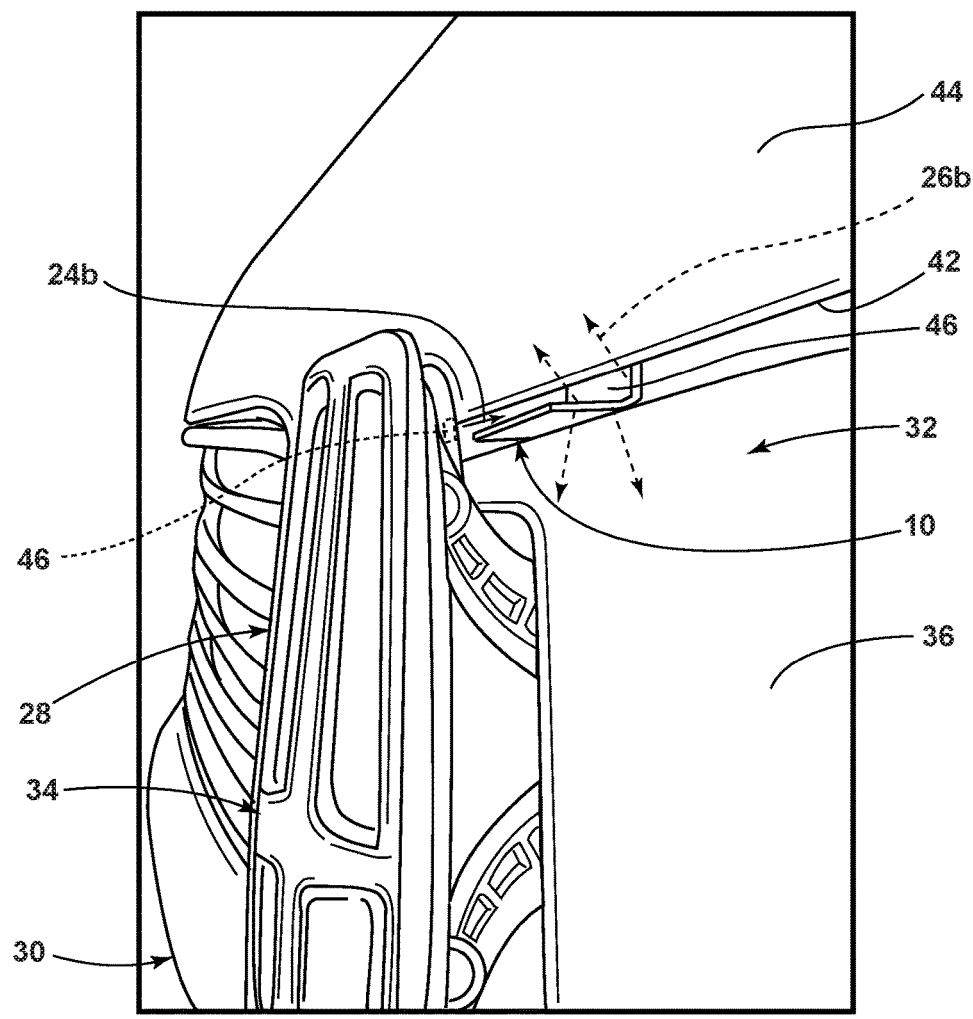
FIG. 3C is a side perspective view of the badge disposed on a front portion of the vehicle, according to some examples.
Figure 3D:
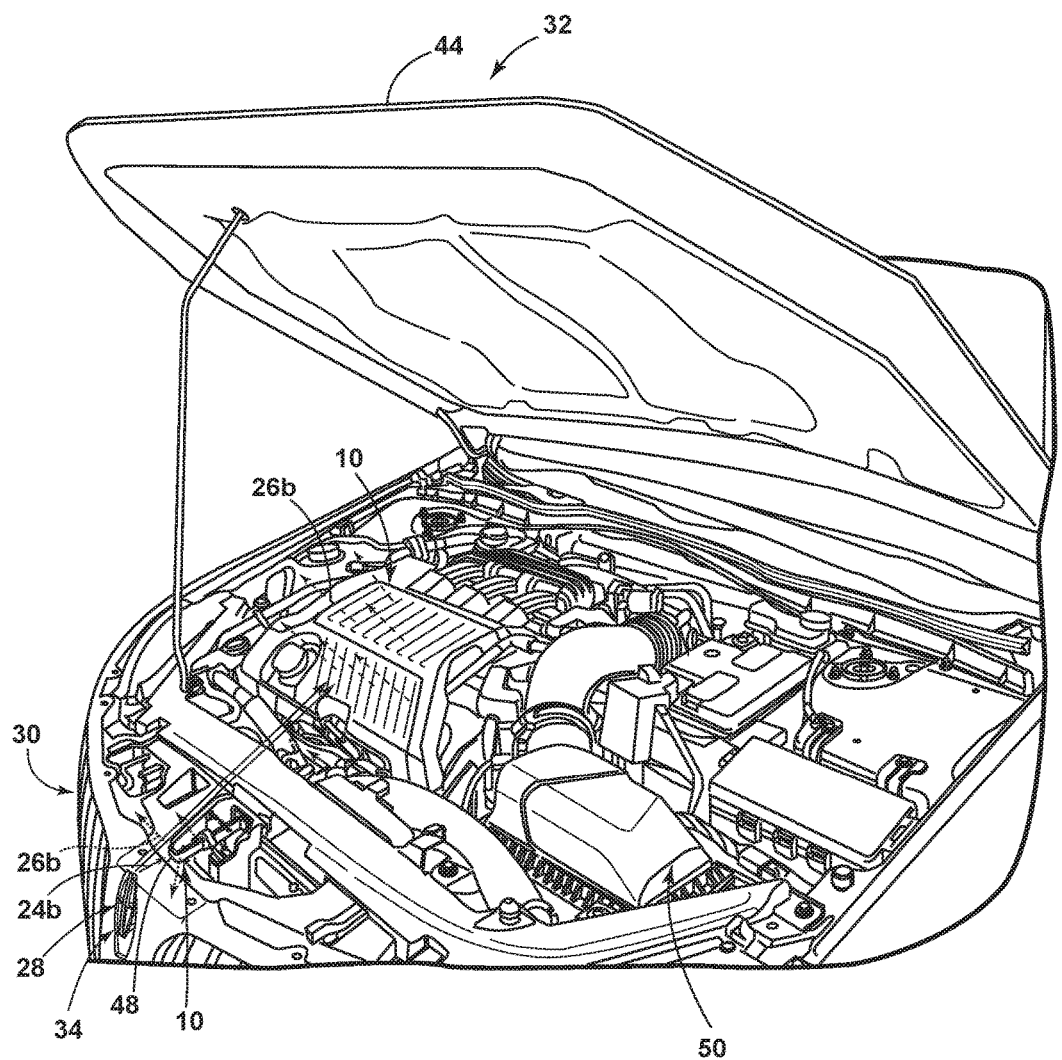
FIG. 3D is a partial front perspective view of the vehicle having an engine compartment that is illuminated by the badge, according to some examples.

As shown in FIGS. 3C and 3D, the badge 28 may emit excitation light 24b towards the secondary hood release latch 48, which may include the luminescent structure 10 thereon. In operation, according to one example, when a primary hood release mechanism, disposed within the vehicle 32, releases the hood 44, the badge 28 may move to the deployed position and emit rearwardly directed excitation light 24b. The motor vehicle operator then moves to the front portion 30 of the vehicle 32 to search for and locate a secondary hood release latch 48 by inserting his or her fingers under the partially opened hood 44.

To assist in locating the secondary hood release latch 48, the luminescent structure 10, disposed on the secondary hood release latch 48, is configured to luminesce in response to receiving excitation light 24b from the light source 46 and is directed at the secondary hood release latch 48. Once located, the motor vehicle operator actuates the secondary hood release latch 48 left or right, or up or down, depending on the design to open the hood 44. It will be appreciated that any component 40 disposed adjacently to, or rearwardly of, the light source 46 may also luminesce in response to receiving excitation light 24 therefrom. For example, a vehicle feature disposed in the engine compartment 50 may have a luminescent structure 10 thereon and luminesce in response to the excitation light 24b once the hood 44 is placed in the open position.

Figure 4:
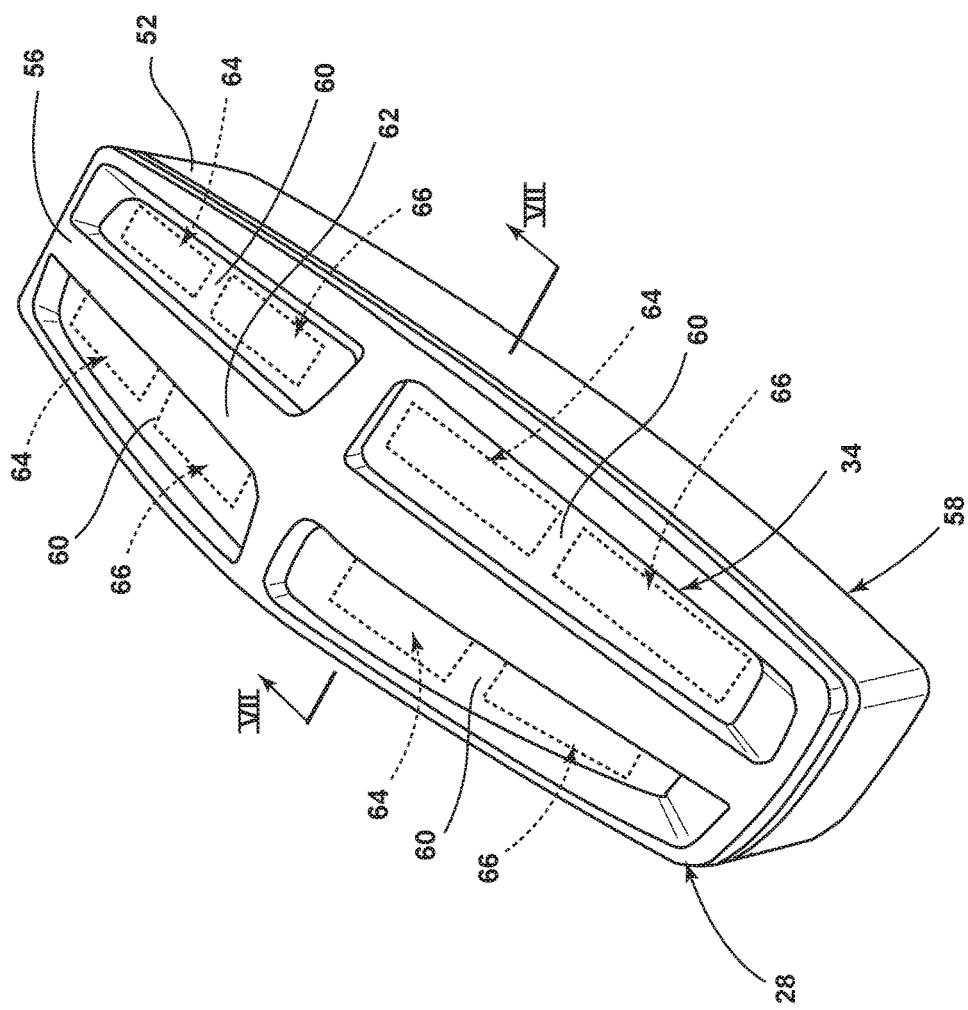
FIG. 4 is a front side perspective view of the badge, according to some examples.
Figure 5:
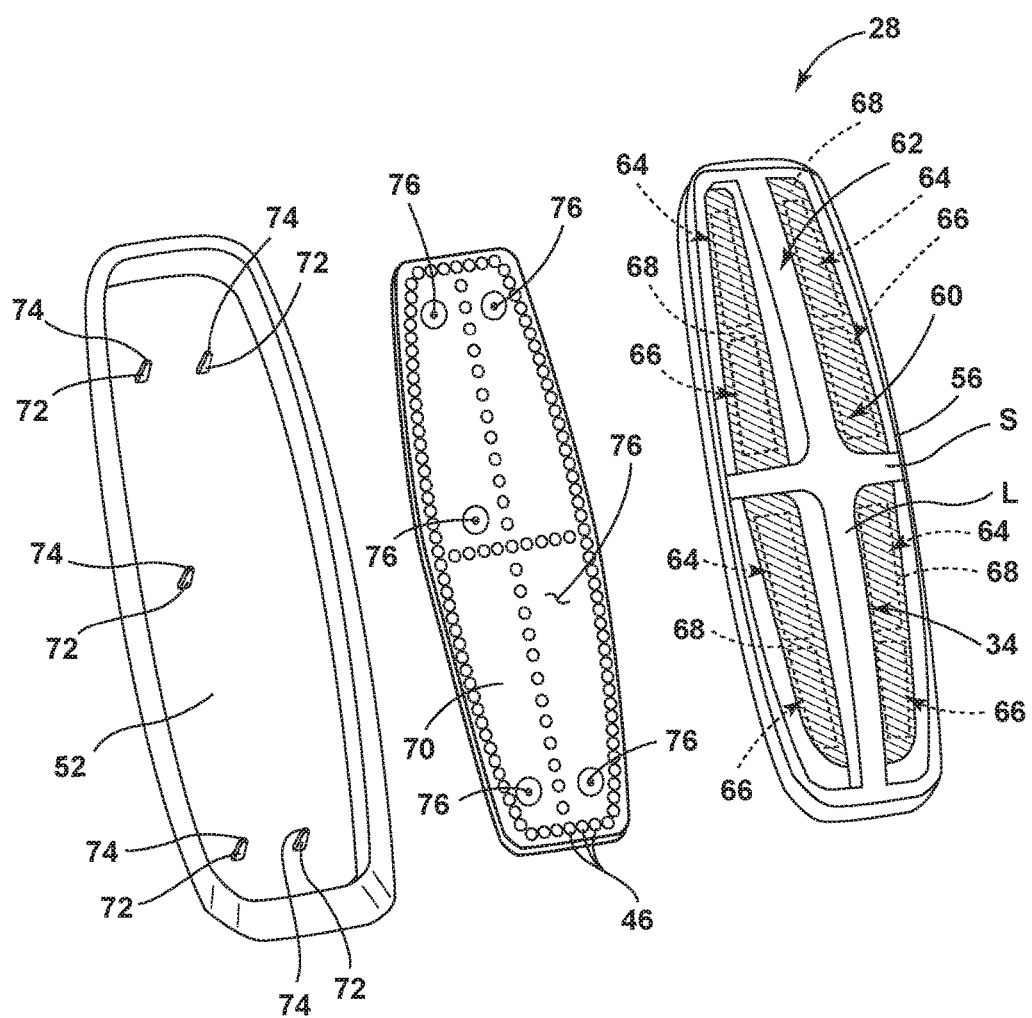
FIG. 5 is an exploded view of the badge, according to some examples.

Referring to FIGS. 4 and 5, the badge 28 is shown, according to one example, having a substrate 52, which may be attached to a support bracket 54 (FIG. 3A) for moving the badge 28 between the retracted and deployed positions. The substrate 52 may be attached to a housing 56. The substrate 52 may form a rear portion 58 of the badge 28 and may be capable of being secured to the badge 28 support bracket 54 via any suitable means known in the art.

The housing 56 includes the viewable portion 34 that may define a background region 60 and indicia 62. The indicia 62 may correspond with a transparent and/or translucent portion and the background region 60 may correspond with one or more substantially opaque portion(s), or vice versa. According to various examples, the background region 60 may be opaque or light blocking whereas the indicia 62 are light transmissive. As shown, the indicia 62 include a rim portion 136 and a cross-portion defined by a long arm L and a short arm S.

With further reference to FIGS. 4 and 5, according to various examples, the substrate 52 may be constructed from a rigid material such as, but not limited to, a polymeric material. The housing 56 may also include a polymeric material. According to various examples, the housing 56 may be configured as a multilayer component, as provided herein. The substrate 52 may be assembled to the housing 56 via sonic welding, laser welding, vibration welding, injection molding, or any other process known in the art. Alternatively, the substrate 52 and/or the housing 56 may be assembled together via the utilization of adhesives and/or fasteners. Alternatively still, the substrate 52 and/or the housing 56 may be integrally formed as a single component.

Referring still to FIG. 4, the badge 28 further includes a sensor assembly 64 and a heating device 66. According to various examples, the sensor assembly 64 includes one or more proximity sensors 68 (FIG. 5) positioned within the badge 28 for sensing the close proximity of the proximate vehicle components 40, such as the front fascia 36 (FIGS. 3A-3C), in relation to the proximity sensor 68, and/or any other object, such as a user's finger. When the proximity sensor 68 detects the vehicle component 40 in closer proximity with a higher threshold signal, indicative of the badge 28 being in the retracted position, a switch output may be generated and a feedback output may be generated that the badge 28, and consequently, the imaging system 38, are in a retracted position. When a lower threshold signal is detected, a switch output may be generated that is indicative of the badge 28 being disposed in the deployed position. Thus, the sensor assembly 64 may provide outputs that notify an occupant of the vehicle 32 of proper and/or improper deployment of the badge 28. In cases of improper deployment, a fault may be generated and supplied to the occupant.

In addition, one or more of the proximity sensors 68 also sense moisture such as humidity or condensation on an interior and/or exterior surface of the badge 28. Sensed moisture may be in the form of humidity, which is water vapor in the air, or may be in the form of condensation, which is water on a surface, which can be in the form of a liquid water or a frozen water (e.g., ice or frost).

Referring to FIGS. 4 and 5, a circuit board 70 may be secured between the substrate 52 and housing 56. According to various examples, the substrate 52 includes a plurality of raised platforms 72. A fastener hole 74 is defined in each platform 72 and a plurality of corresponding through holes 76 is defined by the circuit board 70. Accordingly, a plurality of complimentary mechanical fasteners (not shown) may be inserted through the through holes 76 of the circuit board 70 and mechanically engage the fastener holes 74 for removably fixing the circuit board 70 to the substrate 52.

The one or more light sources 46 may be configured to emit visible and/or non-visible light, such as blue light, ultraviolet (UV) light, infrared light, and/or violet light and may include any form of light source 46. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the badge 28. Further, various types of LEDs are suitable for use as the light sources 46 including, but not limited to, top-emitting LEDs, side-emitting LEDs, and others.

The one or more circuit board(s) 70 may be configured as a printed circuit board (PCB) containing a controller 78 (FIG. 9) including control circuitry including LED drive circuitry for controlling activation and deactivation of the light sources 46. The controller 78 may be disposed in the vehicle 32 and/or within the badge 28. The circuit board 70 may be configured in any fashion known in the art including, but not limited to, any flexible PCB and/or rigid PCB. The controller 78 may activate the light sources 46 based on a plurality of inputs and may modify the intensity of the emitted wavelengths of excitation light 24 by pulse-width modulation, current control and/or any other method known in the art. In various examples, the controller 78 may be configured to adjust a color and/or intensity of the excitation light 24 by sending control signals to adjust an intensity or energy output level of the light sources 46. According to various examples, the controller 78 may increase the intensity of excitation light 24 emitted from any of the light sources 46 up to five times steady state. According to various examples, multicolored light sources 46, such as Red, Green, and Blue (RGB) LEDs that employ red, green, and blue LED packaging may be used to generate various desired colors of light outputs from a single light source 46, according to known light color mixing techniques.

Figure 6:
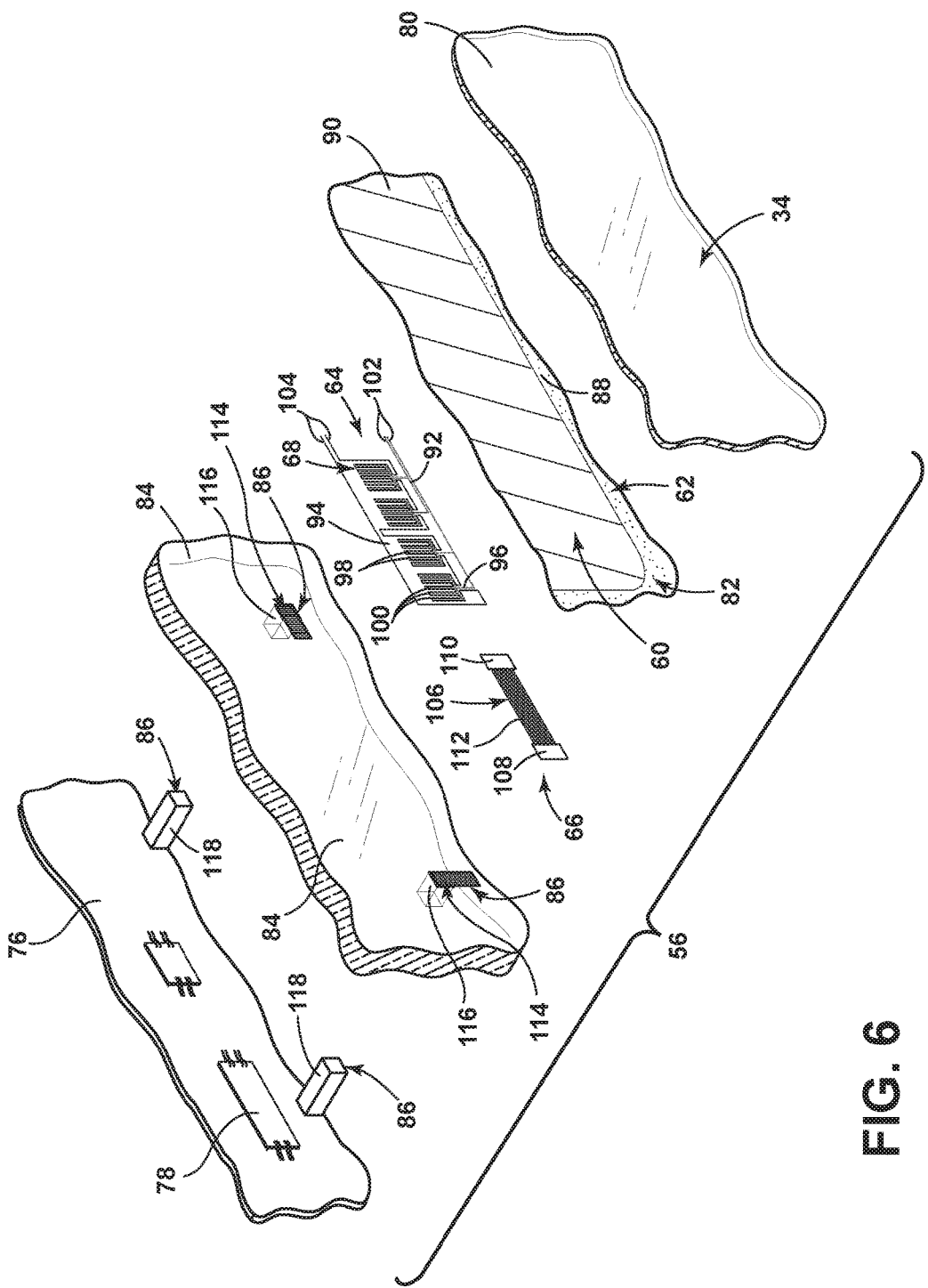
FIG. 6 is a partial exploded view of the housing and a printed circuit board (PCB), according to some examples.

Referring to FIG. 6, the housing 56 may be configured as a multilayer component that may include a film 80, a decorative layer 82 disposed on the film 80, the proximity sensor 68, and the heating device 66, and a structural layer 84. The structural layer 84 may provide structural support for the housing 56 and include one or more connectors 86 for electrically powering the sensors and/or heating devices 66.

The decorative layer 82 is configured to control or modify an appearance of the film 80, and consequently, the housing 56. In various examples, the decorative layer 82 may confer a plurality of various patterns, textures, colors, etc. to various portions of the housing 56. For example, a first portion 88 may have a first color, pattern, texture, etc. and may be utilized in the indicia 62 and a portion 90 may have a second color, pattern, texture, etc. that may be utilized in the background region 60. The decorative layer 82 can be disposed on an interior and/or an exterior surface of the film 80 through any method known in the art, including, but not limited to, sputter deposition, vacuum deposition (vacuum evaporation coating), electroplating, and/or printing onto the film 80. The decorative layer 82 may be a non-conductive material or may have an insulative layer on two opposing sides thereof. The decorative layer 82 may be chosen from a wide range of materials and/or colors, including, but not limited to, silver, chrome, copper, bronze, gold, or any other metallic and/or non-metallic color. Additionally, an imitator of any metallic material may also be utilized without departing from the teachings provided herein. Additionally, the decorative layer 82 may be formed from a mold-in, non-conductive material having a color that looks similar to a metallic material when the vehicle badge 28 is assembled.

In various examples, the decorative layer 82 may have a textured or grained surface. The grained surface may be produced on various portions of the badge 28 and may provide for the housing 56 to have a varied or common appearance with proximately disposed components 40 of the vehicle 32. According to some examples, the grain pattern may be produced by laser etching, or any other method known in the art.

Referring to FIG. 6, the proximity sensors 68 may be configured as capacitive sensors 92. Each of the capacitive sensors 92 includes a first electrode 94 and a second electrode 96. Each of the first and second electrodes 94 and 96 includes a plurality of conductive electrode fingers 98 and 100, respectively. As such, the first electrode 94 has a first plurality of electrode fingers 98 and the second electrode 96 has a second plurality of electrode fingers 100. Each of the first and second electrode plurality of fingers 98 and 100 is generally positioned to be interdigitated or interlaced with the other of the first and second plurality of electrode fingers 98 and 100 to at least some degree to generate a capacitive activation field for sensing the presence of an object. The first electrode 94 may be configured as a receive electrode and receives a sense signal, and the second electrode 96 may be configured as a drive electrode to receive a drive signal.

The capacitive sensors 92 each provide a capacitive sense activation field to sense contact or close proximity (e.g., within one mm) of the proximate vehicle component 40 (e.g., the front fascia 36) in relation to the corresponding capacitive sensor. The capacitive sense activation field of each capacitive sensor 92 detects a vehicle component 40 which has electrical conductivity and dielectric properties that cause a change or disturbance in the capacitive sense activation field as should be evident to those skilled in the art. Each of the capacitive sensors 92 provides a sensed signal for a corresponding proximity sensor 68 indicative of a badge position.

In addition, one or more of the capacitive sensors 92 is also configured to sense moisture such as condensation or humidity proximate or on the badge 28. The sensed moisture may include condensation formed as water vapor on the interior surface of the badge 28. The sensed moisture may also include humidity in the form of water vapor in the air proximate to the interior surface of the badge 28. The moisture is sensed by a change in the signal generated by the capacitive sensor 92 due to the moisture content in the air or on the badge 28. When moisture is detected, the vehicle 32 may activate the heating device 66 or other control device in response to the detected moisture level in an attempt to reduce the moisture.

The capacitive sensors 92 each generally have the drive electrode 96 and the receive electrode 94, each having interdigitated fingers for generating a capacitive field. It should be appreciated that each of the capacitive sensors 92 may be formed by printed conductive ink or by assembling preformed conductive circuitry onto a substrate. According to one example, the drive electrode 96 receives square wave drive signal pulses applied at voltage $V_I$. The receive electrode 94 has an output for generating an output voltage $V_O$. It should be appreciated that the electrodes 94 and 96 and electrode fingers 98 and 100 may be arranged in various configurations for generating the capacitive fields as the sense activation fields, according to various examples.

The drive electrodes 96 receive drive input signals $V_I$ on drivelines 102. The capacitive sensors 92 have a common output line 104 for outputting the corresponding voltage $V_O$. It should be appreciated that the drive and receive electrodes may be otherwise configured so that other types of single electrode or other multiples of electrode arrangements may be used. The sensor assembly 64 may advantageously be formed with conductive ink or may alternatively be formed with flex circuitry.

In the example shown and described herein, the drive electrode 96 of each capacitive sensor 92 is supplied with input voltage $V_I$ as square wave signal pulses having a charge pulse cycle sufficient to charge the receive electrode 94 to a desired voltage. The receive electrode 94 thereby serves as a measurement electrode. The adjacent sense activation fields generated by adjacent capacitive sensors 92 may overlap slightly, or overlap may not exist. When the badge 28 is moved from the deployed position to the retracted position, the proximate vehicle component 40 (e.g., front fascia 36) enters a capacitive sense activation field. The corresponding capacitive sensor detects a disturbance caused by the vehicle component 40 to the activation field and determines whether the disturbance is sufficient to generate an input with the corresponding capacitive sensor. Similarly, when moisture, such as humidity or condensation on the badge 28 is detected, the moisture causes a disturbance in the activation field, which generates a signal that is processed to determine the moisture level. The disturbance of the activation field is detected by processing the charge pulse signal associated with the corresponding signal channel for that capacitive sensor. Each capacitive sensor 92 has its own dedicated signal channel generating a distinct charge pulse signal, which may be processed individually.

With further reference to FIG. 6, the heating device 66 may incorporate any type of device that may be heated when activated by the controller 78. According to various examples, the heating device 66 may be configured as an ink that is coated on to the decorative layer 82 and/or the film 80 by conventional screen printing, flexographic printing, or gravure printing. The wet film 80 thus coated on the decorative layer 82 and/or the film 80 may then be dried by heating to remove the solvent and finally yields a solid polymeric film with a film thickness that may be in the order of micrometers (e.g., 5-25 micrometers), according to some examples.

According to various examples, a Positive Temperature Coefficient (PTC) heating device 106 may be utilized, which refers to a material that experiences an increase in electrical resistance when its temperature is raised and can be produced by conventional printing technologies. A PTC heater based on the polymer thick film PTC carbon compositions can be configured by many electric thermo-resistor units in parallel or in serial to have the designed heating energy density. Each thermo-resistor unit includes two electrodes 108, 110 and a printed resistive strip 112 with a resistance (R) sandwiched between two electrodes 108, 110. Upon applying a voltage (V) between the electrodes, an electric current (A) passes through the PTC resistive strip 112, yields an electric heating power output (W), following the ohm law: that is the output Power (W)=Current (A)×Voltage (V) and the Current (A)=Voltage (V)/Resistance (R), or $W=V^2/R$. Under an output heating power, the temperature of the heating unit is increased. Due to the PTC nature of polymer thick strip 112, its resistance is increased along with the increase in temperature, which causes, in turn, the decrease of output heating power. At a certain temperature, the heating power decreases to a point, which just balances the heat loss to its surrounding environment, so the temperature approaches an equilibrium and maintains constantly afterward. Thus the PTC heater may demonstrate a self-regulating function.

An exemplary polymeric PTC ink composition may include four parts (or components), and these four parts can be functionally classified as (1) the electrically conductive component to provide electric conductivity; (2) the polymer component as the binder or adhesive to disperse the conductive component and to allow the PTC composition to be coated on a substrate; (3) the solvent to mix all components together in a liquid or gel form and allow the whole composition to be transferred onto a substrate by conventional printing methods; (4) the optional one or more additives to assist in stabilizing the ink composition and improving printability. According to various examples, a PTC ink is printed onto portions of the decorative layer 82 and then dried at high temperature to remove the solvent thereby yielding a PTC film composing the solid parts of PTC ink, including an electrical conductor, polymer resin, and optional additives. As discussed herein, the film 80 may also include the decorative layer 82, which may contain the luminescent structure 10. The film 80 may also include the proximity sensors 68 thereon.

Referring still to FIG. 6, the film 80 having the decorative layer 82, the proximity sensor 68, and/or the heating device 66 thereon may be thermoformed (e.g. via vacuum forming) into a three-dimensionally shaped "preform." The preform may be in the geometric shape of the end trim part intended or alternatively of an intermediate shape. The preform is then positioned in a cavity of an injection-molding device. The semi-molten plastic material is injected into the cavity behind the preform so as to bond thereto thereby forming the structural layer 84. After the injection molding device cycles through holding and cooling, the mold is opened and the resulting housing 56 is ejected. In alternate examples, the film 80 may be formed and molded in any manner known in the art. After the film 80 is formed into a desired geometric shape, the decorative layer 82, the proximity sensor 68, and/or the heating device 66 may be attached and/or disposed on the film 80.

The connectors 86 may be integrally molded with the structural layer 84. The power supply connector 116 includes a male connector 118 for supplying electrical energy from a power supply device (e.g., vehicle battery) to a female mating connector 116. Either the female connector 116 or the male connector 118 may be disposed within the structural layer 84 with the corresponding connector disposed on the circuit board 70. Each connector 116 within the structural layer 84 may include a base portion 114 that electrically couples with the proximity sensor 68 and/or heating device 66.

Figure 7:
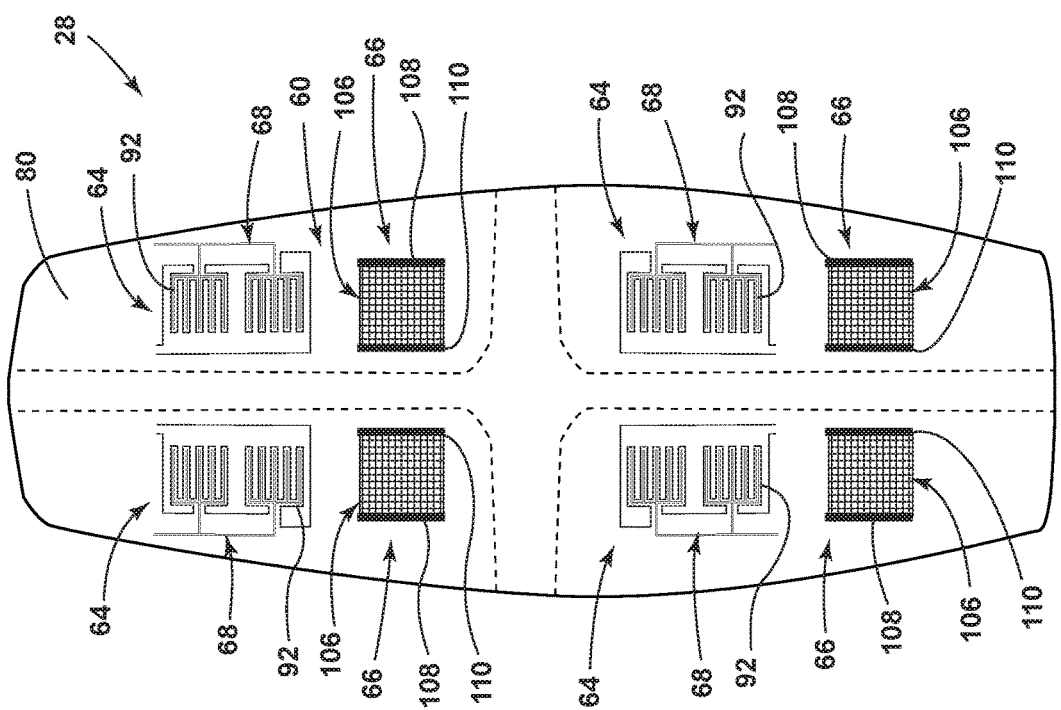
FIG. 7 is a front perspective view of a film of the housing that has the sensor assembly and the heating device thereon, according to some examples.

Referring to FIG. 7, the capacitive sensors 92 and heating devices 66 are exemplarily positioned on the film 80 according to various examples. As illustrated in FIG. 7, the capacitive sensors 92 may be disposed within each of the opaque portions that form the background region 60. However, the capacitive sensors 92 may be partially, and/or substantially transparent, such that the capacitive sensor 92 may be disposed within any portion of the badge 28.

As illustrated, each capacitive sensor 92 is disposed above each respective heating device 66, respectively. However, the heating devices 66 and capacitive sensors 92 may be in any orientation without departing from the teachings provided herein. As condensation forms on the badge 28, the condensation may accumulate around forwardly extending portions of the badge 28, such as those portions of the indicia 62 (FIG. 8) that extend forwardly of the background region 60. Accordingly, the heating devices 66 may be disposed proximate to these locations to expedite the deicing and/or defogging of the badge 28.

Figure 8:
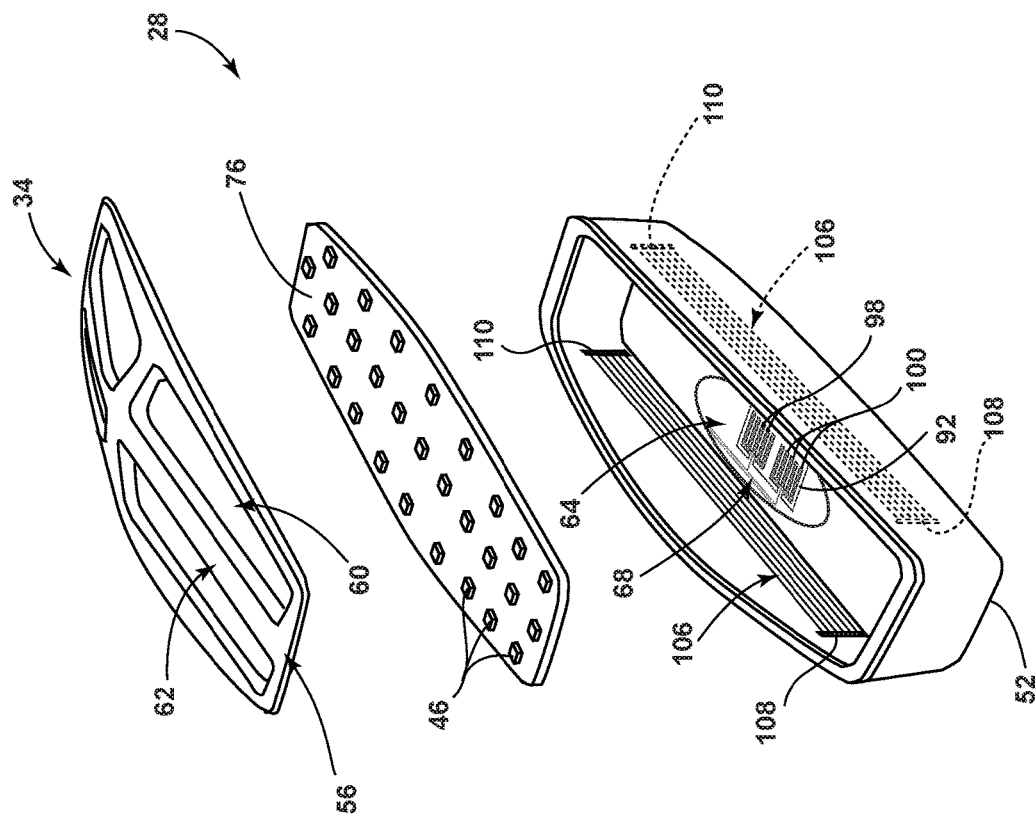
FIG. 8 is a perspective exploded view of the badge having one or more proximity sensors and one or more heating devices on a substrate of the badge, according to some examples.

Referring to FIGS. 7 and 8, in addition to the sensor assembly 64 detecting the moisture, such as humidity and condensation, on the badge 28 with the use of the one or more proximity sensors 68, the proximity sensor 68 may additionally detect the position of the badge 28. The proximity sensor 68, configured, as a capacitive sensor 92 in the example shown and described herein, is sensitive to moisture, which affects the sensor activation field. When the badge 28 moves from the deployed position to a retracted position, a rather fast rise in the signal count may occur. Conversely, moisture such as humidity or condensation will cause the signal to rise at a slower rate. Thus, activations by movement of the badge 28 can be distinguished from the moisture and the sensed signal can be used to generate a moisture value that may be used for other purposes on the vehicle 32 such as by the heating device 66 or other control device(s). In one example, a single proximity sensor 68 may be used to determine the moisture. According to another example, a plurality of proximity sensors 68 may be employed to generate multiple moisture signals, which may be averaged to provide an average moisture measurement.

One or more heating devices 66 may be disposed on the substrate 52 of the badge 28 that may be activated upon a determination by one or more of the proximity sensors 68 that condensation is disposed on the badge 28. Additionally, and/or alternatively, the vehicle 32 may include other devices capable of determining a likelihood that condensation is disposed on the badge 28, such as a thermometer and/or rain sensor. In response, the heating device 66 may be activated to remove the potential condensation from the badge 28. Moreover, the substrate 52 heating devices 66 may be activated independently of the housing heating devices 66, or all heating devices 66 may be initiated contemporaneously upon a detection of condensation on any portion of the badge 28.

Figure 9:
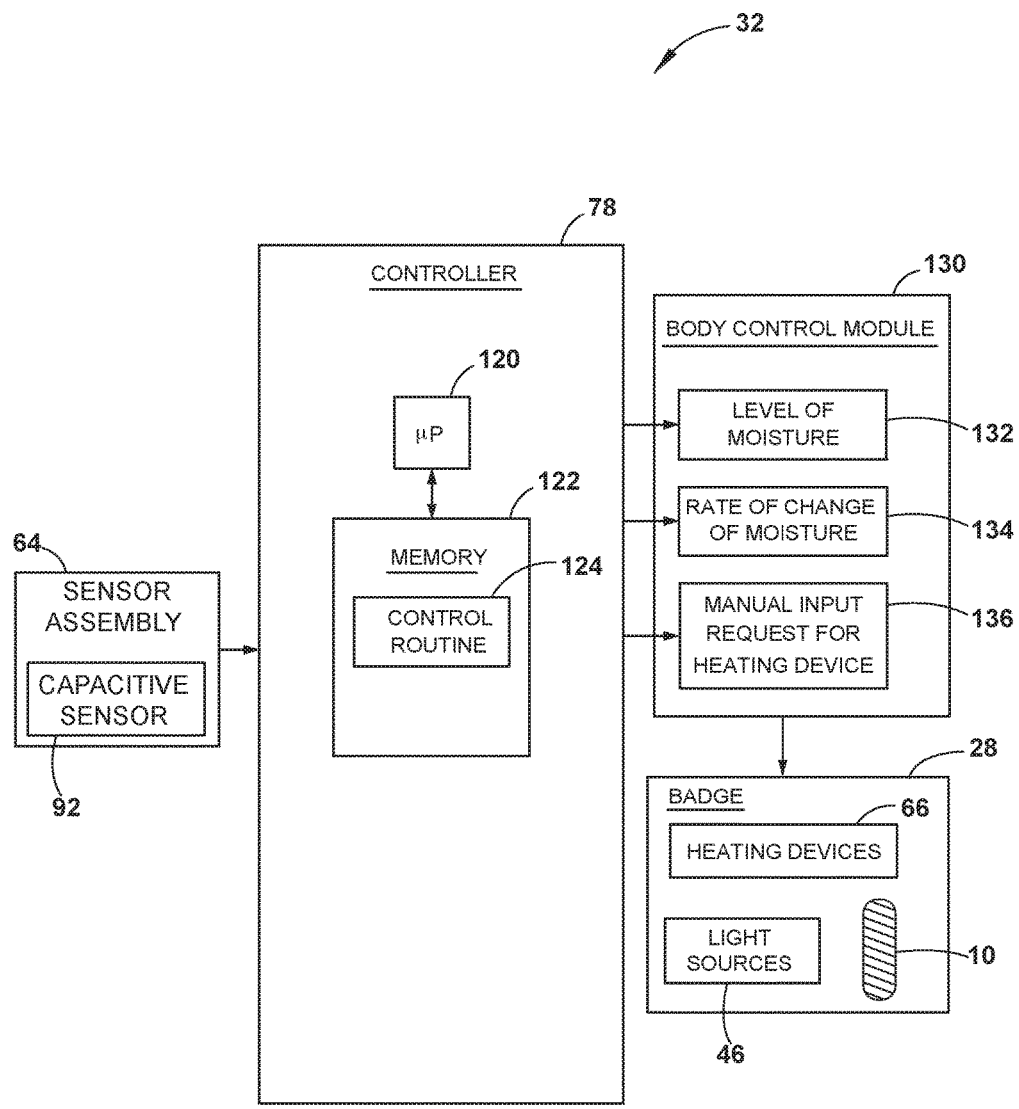
FIG. 9 is a block diagram illustrating controls for determining the badge position and sensing moisture and for controlling the badge, the heating devices, and the light sources according to some examples.

Referring to FIG. 9, the sensor assembly 64 is illustrated according to various examples. The plurality of capacitive sensors 92 is shown providing respective inputs to a controller 78, such as a microcontroller. The controller 78 may include circuitry, such as a microprocessor 120 and memory 122. The control circuitry may include sense control circuitry processing the activation field of each capacitive sensor 92 to sense user activation by comparing the activation field signal to one or more thresholds pursuant to control routines 124. It should be appreciated that other analog and/or digital control circuitry may be employed to process each capacitive activation field, to determine user activation, and initiate an action. The controller 78 may employ a Q matrix acquisition method available by ATMEL®, according to one example. Exemplary capacitive sensors 92 are described in the Apr. 9, 2009, ATMEL® Touch Sensors Design Guide 10620 D-AT42-A4/09, the entire reference hereby being incorporated herein by reference.

The controller 78 may include an analog to digital (A/D) comparator integrated within or coupled to the microprocessor 120 which may receive the voltage output $V_O$ from each of the capacitive sensors 92, convert the analog signal to a digital signal, and provide a digital signal to the microprocessor 120. The controller 78 may include a pulse counter integrated within or coupled to the microprocessor 120 that counts the charge signal pulses that are applied to each drive electrode of each proximity sensor 68, performs a count of the pulses needed to charge the capacitor until the voltage output $V_O$ reaches a more predetermined voltage, and provides the count to the microprocessor 120. The pulse count is indicative of the change in capacitance of the corresponding capacitive sensor 92. The controller 78 may provide a pulse width modulated signal to a pulse width modulated drive buffer to generate the square-wave pulse, which is applied to each drive electrode of each capacitive sensor 92. The controller 78 may process the received signals and make a determination as to activation of one of the capacitive sensors 92 and generate one or more signals to activate one or more of the heating devices 66.

The controller 78 may determine the moisture present at or proximate to the badge 28 and may provide moisture value information to one or more control devices including the body control module 130. The moisture values may include the level of moisture 132 and the rate of change of moisture 134. In addition, a user may manually input a request for heating 136, or defogging, of the badge 28. The body control module 130 may activate or control one or more devices, such as the heating device 66, in response to a manual input request for heating 136, or defogging, or based on the detected level of moisture 132 or rate of change of moisture 134. A manual input request for heating may be made by way of a user activating one or more of the proximity sensors 68 such as by a user contacting the housing 56 of the badge 28 with their hand.

Referring still to FIG. 9, the luminescent structure 10 may be optically coupled with one or more light sources 46 within the badge 28 or disposed proximately to the badge 28. In operation, the luminescent structure 10 may include a plurality of luminescent materials 18 therein that luminesce in response to receiving light of a specific wavelength spectrum. According to various examples, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

Figure 10:
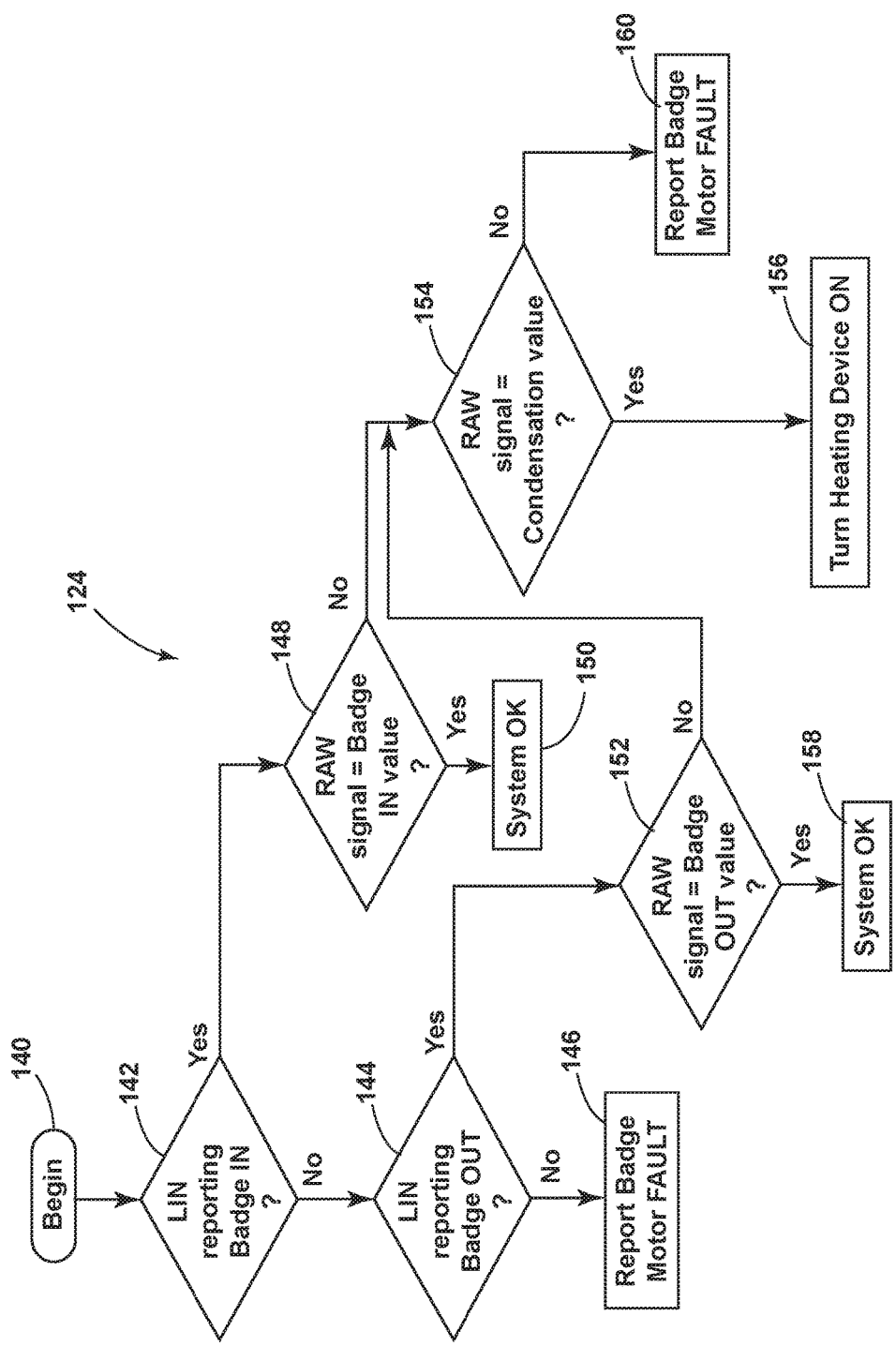
FIG. 10 is a flow chart illustrating a routine for controlling the heating device, according to some examples.

Referring to FIG. 10, the control routine 124 for controlling heating of the badge 28 is illustrated, according to one example. The control routine starts at step 140 and proceeds to decision step 142 to determine if the badge 28 is reported in the retracted position by the one or more proximity sensors 68 disposed within the badge 28. If not, the routine determines if the badge 28 is reported in the deployed position at step 144. If neither is true, a badge fault is reported at step 146. If the badge 28 is reported in the retracted position, the routine determines if a raw signal of the capacitive sensor 92 is substantially equal to a badge retracted value at step 148. If the two values are substantially equal, the routine ends at step 150. Likewise, if the badge 28 is reported as deployed, the routine determines if a raw signal of the capacitive sensor 92 is substantially equal to a badge deployed value step 152. If the values are substantially similar, the method ends at step 158. If the raw signal from the capacitive sensor 92 is not substantially equal to the retracted or deployed badge values, at step 154, the routine compares the raw signal to predefined condensation values. If the raw signal is substantially equal to the condensation values, the heating device 66 is activated at step 156. If the raw signal is not substantially equal to the condensation values, a badge fault is reported at step 160. As used herein, the term "substantially" refers to a range of values for each of the values provided. The range may include values that are ±10%, ±20%, ±50%, and/or ±100% according to various examples without departing from the scope of the present disclosure.

Figure 11:
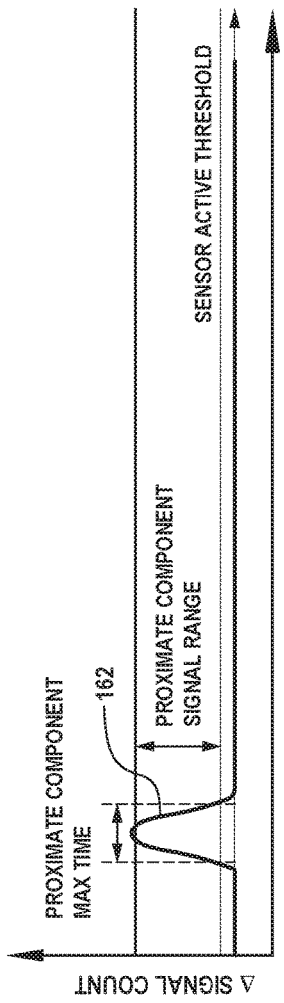
FIG. 11 is a graph illustrating the signal count for one signal channel associated with a capacitive sensor showing an activation motion profile.
Figure 12:
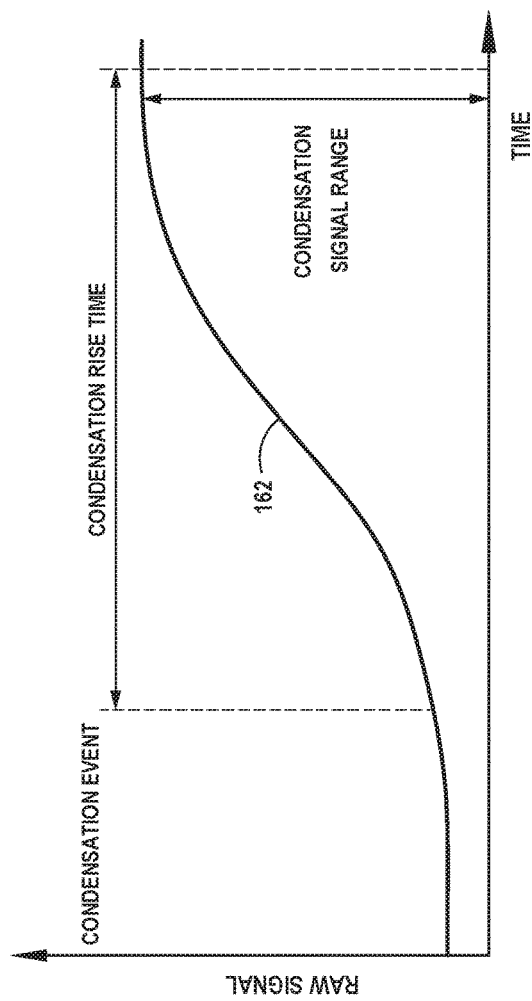
FIG. 12 is a graph illustrating the raw signal for one signal channel associated with the capacitive sensors showing the effect of sensed moisture.
Figure 13:
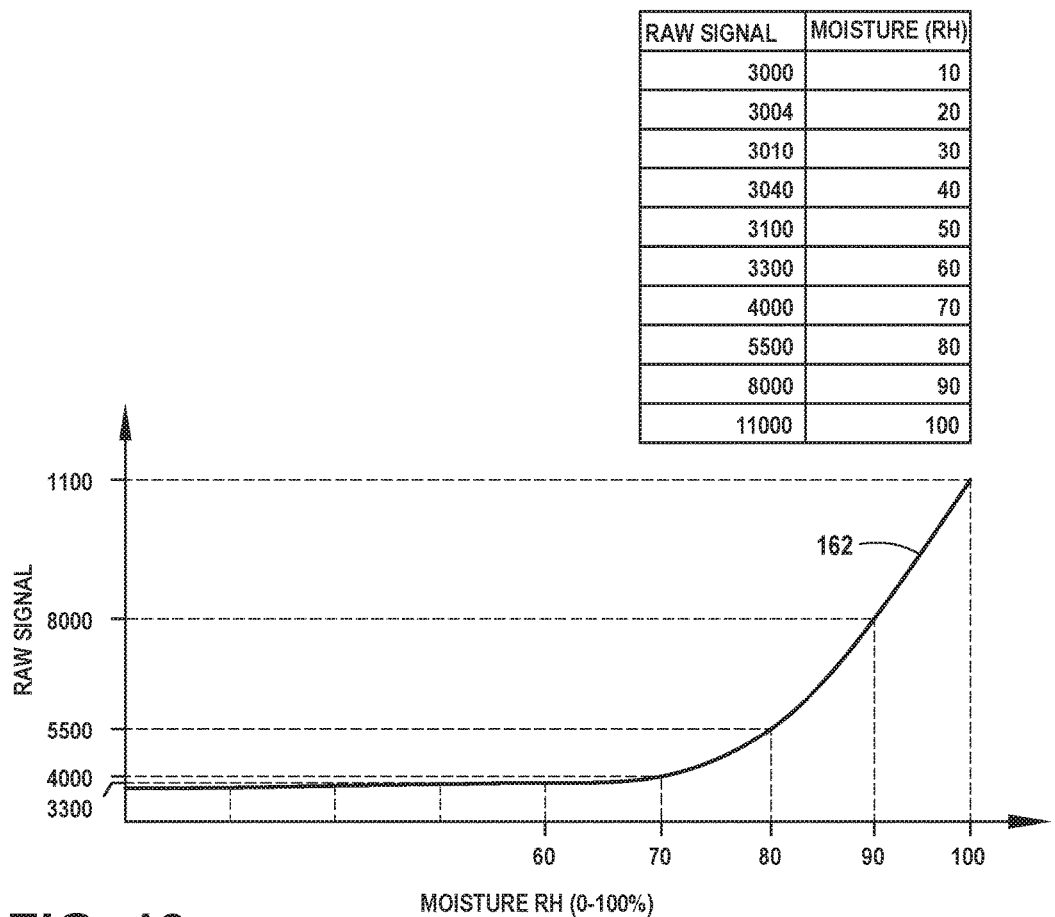
FIG. 13 is a graph illustrating the raw signal for expected moisture values.

In FIGS. 11-13, the change in sensor charge pulse counts shown as signal 162 for a signal channel associated with the plurality of proximity sensors 68, is illustrated for a proximal disposition of the badge 28 to the proximate vehicle component 40 in FIG. 11 and is shown as a raw signal for humidity detection in FIGS. 12 and 13, according to one example. The change in signal 162 is the count value difference between an initialized referenced count value without any other object present in the activation field and the corresponding sensor reading with low or no humidity. In the example shown in FIG. 11, the vehicle component 40 enters the activation field associated with proximity sensors 68 as the badge 28 moves from the deployed position to the retracted position. The signal 162 is the change (Δ) in sensor charge pulse count associated with a capacitive sensor 92. In the disclosed example, the proximity sensors 68 are capacitive sensors 92. When a vehicle component 40 is in contact with or close proximity of a sensor 68, the vehicle component 40 alters the capacitance measured by the corresponding sensor 68. The capacitance is in parallel to the untouched sensor pad parasitic capacitance, and as such, measures as an offset. The user or operator induced capacitance is proportional to the vehicle component 40 or other body part dielectric constant, the surface exposed to the capacitive pad, and is inversely proportional to the distance of the vehicle component 40 to the switch button. According to one example, each sensor is excited with a train of voltage pulses via pulse width modulation (PWM) electronics until the sensor is charged up to a set voltage potential. Such an acquisition method charges the receive electrode to a known voltage potential. The cycle is repeated until the voltage across the measurement capacitor reaches a predetermined voltage. Placing a vehicle component 40 in close proximity to the sensor introduces external capacitance that increases the amount of charge transferred each cycle, thereby reducing the total number of cycles required for the measurement capacitance to reach the predetermined voltage. The vehicle component 40 causes the change in sensor charge pulse count to increase since this value is based on the initialized reference count minus the sensor reading.

Referring to FIG. 11, as the vehicle component 40 proximate the badge 28 approaches a proximity sensor 68 associated with the signal channel, the vehicle component 40 enters the activation field associated with the capacitive sensor 92 which causes disruption to the capacitance, thereby resulting in a sensor count increase as shown by signal 162 having a typical proximate vehicle component 40 activation motion profile. During a typical retraction activation, the signal rises relatively quickly to exceed a sensor active threshold and then reaches a peak value and maintains that value while the badge 28 is retracted. Once the badge 28 is moved to the deployed position, the signal then drops back down below the sensor active threshold. A switch activation may be detected based on the signal exceeding a threshold value and/or based on a rise time of the signal.

Referring to FIG. 12, as moisture in the form of condensation on the badge 28 or humidity proximate thereto increases, the moisture enters the activation field associated with the capacitive sensor 92 and causes a disruption to the capacitance, thereby resulting in a raw signal increase as shown by signal 162. The effect of the moisture on the sensor generates a raw signal that rises at a slower rate as compared to an activation motion of the vehicle component 40 when the badge 28 is moved from a first position to a second position. Accordingly, by monitoring the rise time of the signal and the amplitude of the signal and comparing the signal to known values of moisture, the condensation or humidity can be sensed by the proximity sensor 68.

FIG. 13 shows an example of the raw signal for a sensor signal affected by moisture (e.g., humidity) and a look-up table that links the raw signal data to the moisture level based on testing. The data in the look-up table may be generated during testing of the assembly to determine the raw signal count for each of a plurality of known moisture levels. The moisture values between those values listed in the look-up table may be determined using interpolation. During manufacture, a calibration routine may be performed at a known moisture point to calibrate the bias in the scale. Accordingly, by processing the raw signal data generated by the capacitive sensor 92, the corresponding moisture level may be determined.

Figure 14:
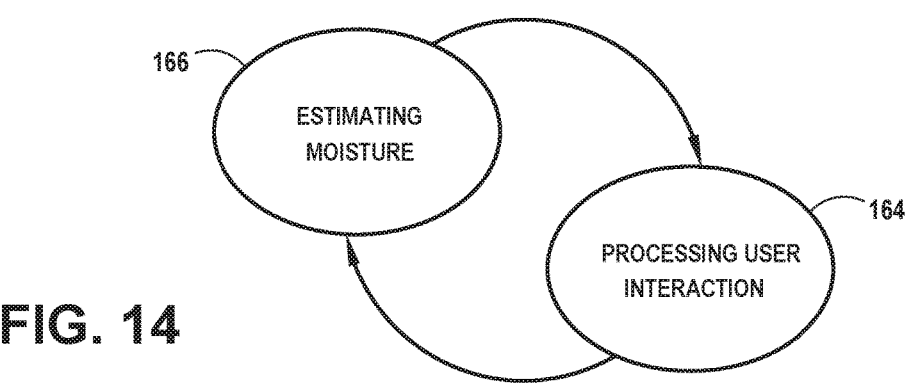
FIG. 14 is a state diagram illustrating switch activation and moisture estimation states for the badge.

Referring to FIG. 14, the state diagram illustrates two modes of operation that are available with the sensor assembly 64. In a first mode, the sensor assembly 64 may operate in a processing user interaction state 164 to detect the proximity of a vehicle component 40 on a sensor for a switch activation. In a second mode, the sensor assembly 64 may operate in an estimating moisture state 166 to determine the moisture level. It should be appreciated that the processing user interaction mode 164 may operate during a substantial amount of time, while the estimating moisture mode 166 may periodically be operated. It should be appreciated that the processing user interaction mode 164 and estimating moisture mode 166 could be executed simultaneously.

The proximity sensors 68 may be manufactured using thin film technology, which may include printing a conductive ink mixed with a solvent to achieve a desired electrical circuit layout. Likewise, the heating device 66 may also be manufactured using thin film technology that includes printing a material onto a substrate. The printed ink/material may be formed into a sheet, which is cured in a curing process using controlled heating and light/heat strobing to remove the solvent. Variations in existing curing processes may result in residual solvent trapped in the electrical traces, which may result in sensors that are sensitive to changes in temperature and moisture. As condensation builds up on a proximity sensor 68, the raw capacitive signal and the Δ signal count may change. The condensation buildup may occur, for example, when driving in a rainstorm or on a hot, humid summer day. The proximity sensor 68 advantageously detects a badge position and moisture using the same sensor. Additionally, the heating device 66 may be activated in response to a detection of condensation from the proximity sensor 68. Accordingly, the sensor assembly 64 advantageously provides both proximity sensing for switch activation and moisture measurements.

Accordingly, the sensor assembly 64 advantageously provides for enhanced moisture sensing on a badge 28 or emblem disposed on the vehicle 32. Additionally, the assembly 64 detects a position of the badge 28 or emblem. It is further conceivable that the sensor assembly 64 may be employed on other movable vehicle components 40 such as door handle, mirrors, and/or vehicle doors, according to other examples. The heating device 66 may remove some condensation from the badge 28 or emblem once activated.

According to various examples, a badge is provided herein. The badge includes a proximity sensor located on said badge providing an activation field. Control circuitry is configured to monitor a signal responsive to the activation field and determine a switch activation based on the signal. The control circuitry is further configured to determine a moisture value based upon the signal. The badge may be configured as a vehicle badge. Examples of the badge can include any one or a combination of the following features:
  a heating device configured to remove condensation from a surface of the badge;
  the badge includes a substrate coupled to a housing, the housing defining a viewable portion;
  the badge is configured to move between retracted and deployed positions;
  the switch activation occurs as the badge moves from a deployed position to a retracted position and a proximate vehicle component enters the activation field of the proximity sensor;
  the proximity sensor comprises a capacitive switch comprising one or more capacitive sensors;
  the proximity sensors comprises a plurality of proximity sensors and the control circuitry determines the moisture value based on signals generated by two or more proximity sensors;

the control circuitry determines the moisture value for each of the two or more proximity sensors and further determines an average moisture based on the moisture values for the two or more proximity sensors;

the moisture value is determined based on amplitude of the signal;

the moisture value is determined by comparing the amplitude of the signal to known humidity values in a look-up table; and/or the control circuitry determines the switch activation based on a rate of change of the signal and an amplitude of the signal.

Moreover, a method of monitoring vehicle conditions with a badge is provided herein. The method comprises disposing a proximity sensor between a substrate and housing; providing an activation field of the sensor; monitoring a signal responsive to the activation field; determining a switch activation based on the signal; and determining a moisture value based upon the signal.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A badge, comprising:
a proximity sensor located on a housing providing an activation field; and
a control circuitry configured to monitor a signal responsive to the activation field to determine a switch activation based on the signal and to determine a moisture value based upon the signal, wherein the proximity sensor is disposed on a structural layer, the structural layer having an integrally formed electrical connector.

2. The badge of claim 1, further comprising:
a heating device configured to remove condensation from a surface of the badge.

3. The badge of claim 1, wherein the badge includes a substrate coupled to the housing, the housing defining a viewable portion.

4. The badge of claim 1, wherein the badge is configured to move between a retracted and a deployed position.

5. The badge of claim 1, wherein the switch activation occurs as the badge moves from a deployed position to a retracted position and a proximate, conductive vehicle component enters the activation field of the proximity sensor.

6. The badge of claim 1, wherein the proximity sensor comprises a capacitive switch comprising one or more capacitive sensors.

7. The badge of claim 1, wherein the proximity sensors comprise a plurality of proximity sensors and the control circuitry determines the moisture value based on signals generated by two or more proximity sensors.

8. The badge of claim 7, wherein the control circuitry determines the moisture value for each of the two or more proximity sensors and further determines an average moisture based on the moisture values for the two or more proximity sensors.

9. The badge of claim 1, wherein the control circuitry determines the switch activation based on a rate of change of the signal and an amplitude of the signal.

10. The badge of claim 1, wherein the moisture value is determined based on amplitude of the signal.

11. The badge of claim 10, wherein the moisture value is determined by comparing the amplitude of the signal to known humidity values in a look-up table.

12. The badge of claim 1, further comprising:
a light source disposed between a housing and a substrate; and
a luminescent structure disposed on a decorative layer of the housing disposed between the proximity sensor and a viewable portion and configured to luminesce in response to receiving an excitation light from the light source.

13. A vehicle badge comprising:
a substrate coupled to a housing, the substrate and housing movable between a retracted and a deployed position, wherein the housing defines a background region and indicia;
a proximity sensor located within the background region and providing an activation field; and
a control circuitry configured to monitor a signal responsive to the activation field to determine a position of the substrate and to determine a moisture value based upon the signal.

14. The vehicle badge of claim 13, wherein a switch activation occurs from the proximity sensor as the badge moves between the deployed and the retracted positions and a proximate vehicle component enters or exits the activation field of the proximity sensor.

15. The vehicle badge of claim 13, further comprising:
a heating device configured to remove condensation from a surface of the badge.

16. A vehicle badge comprising:
a substrate coupled to a housing, the substrate and housing movable between a retracted and a deployed position;
a proximity sensor located on the substrate or the housing and providing an activation field;
a heating device configured as an ink and located on the substrate or the housing; and
a control circuitry configured to determine a moisture value based upon a signal and activate the heating device when condensation is detected on the substrate or the housing.

17. The vehicle badge of claim 16, further comprising:
a light source disposed between the housing and the substrate; and
a luminescent structure disposed on the housing and configured to luminesce in response to receiving an excitation light from the first light source.

18. The vehicle badge of claim 15, wherein the housing is configured as a multilayer component that includes a film, a decorative layer disposed on the film, the proximity sensor, the heating device, and a structural layer.

19. The vehicle badge of claim 18, wherein the structural layer includes an integrated connector for powering the heating device.

* * * * *